United States Patent [19]
Belenkiy et al.

[11] Patent Number: 5,528,712
[45] Date of Patent: Jun. 18, 1996

[54] DUPLEX CONNECTOR

[76] Inventors: Yuriy Belenkiy, 8655 Shermer Rd., Niles, Ill. 60714; Igor Grois, 4010 Greenacre Dr., Northbrook, Ill. 60062; Irina Gumin, 9317 Lavergne Ave., Skokie, Ill. 60077; Ilya Makhlin, 492 S. Kiowa Trail, Wheeling, Ill. 60090; Mark Margolin, 6611 N. Lawndale, Lincolnwood, Ill. 60645; Michael J. Pescetto, 5809 Charleston Ct., Hanover Park, Ill. 60103

[21] Appl. No.: 383,628

[22] Filed: Feb. 6, 1995

[51] Int. Cl.$^6$ ................................. G02B 6/36
[52] U.S. Cl. ........................................ 385/78
[58] Field of Search .................. 385/53, 55, 56, 385/58, 59, 60, 70, 71, 76, 77, 78, 89

[56] References Cited

U.S. PATENT DOCUMENTS

| | | | |
|---|---|---|---|
| 4,687,291 | 8/1987 | Stape et al. | 385/59 |
| 4,953,929 | 9/1990 | Basista et al. | 350/96.2 |
| 5,123,071 | 6/1992 | Mulholland et al. | 385/53 |
| 5,293,581 | 3/1994 | DiMarco | 385/76 |
| 5,325,454 | 6/1994 | Rittle et al. | 385/76 |
| 5,386,487 | 1/1995 | Briggs et al. | 385/59 |

*Primary Examiner*—John Ngo

[57] ABSTRACT

A duplex connector system is provided for coupling two individual simplex fiber optic connectors in a side-by-side alignment. Each fiber optic connector includes a housing in which an optical fiber cable is terminated through a rear end of the housing. First and second strain relief boots are respectively interengageable with the housings of the connectors at the rear ends thereof and encompass the optical fiber cables. Resilient portions interconnect the first and second strain relief boots and are oriented therebetween for enabling the boots to hold the connectors in their side-by-side alignment while allowing relative motion between the connectors during mating and unmating process.

10 Claims, 3 Drawing Sheets

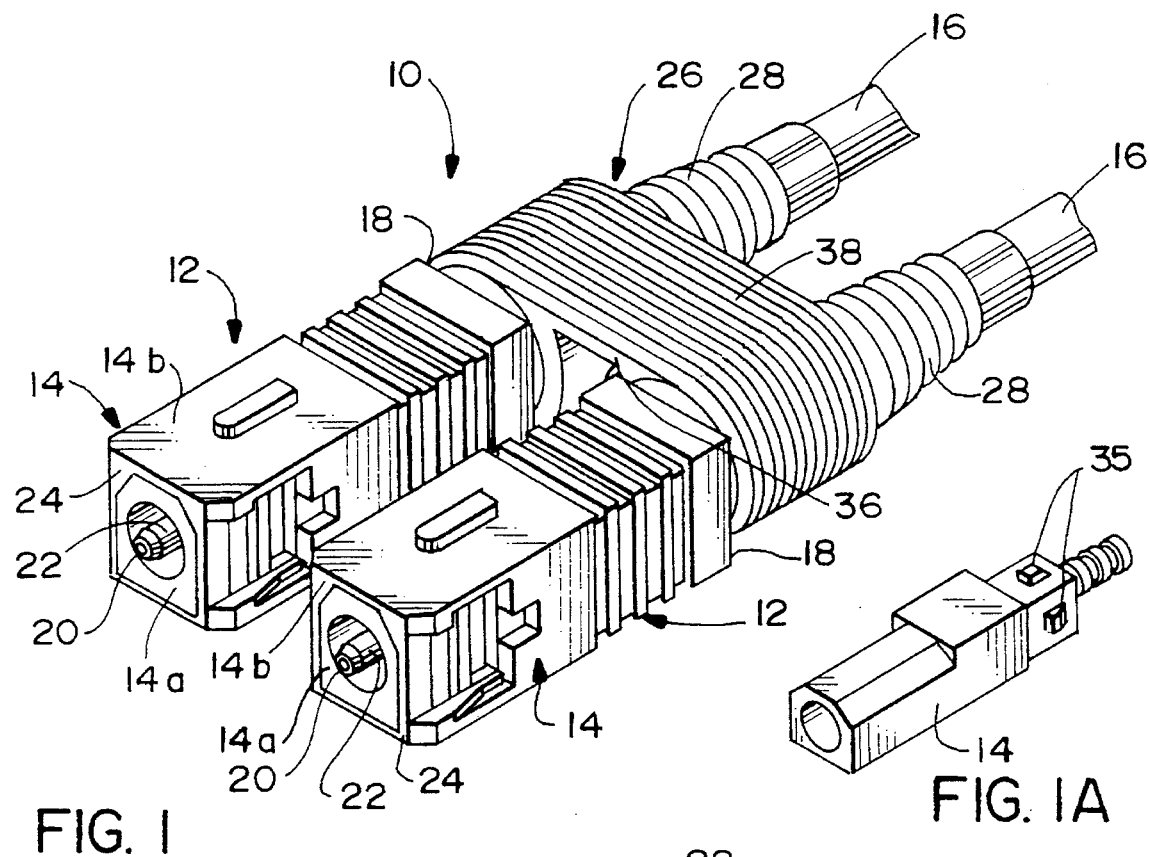
FIG. 1
FIG. 1A
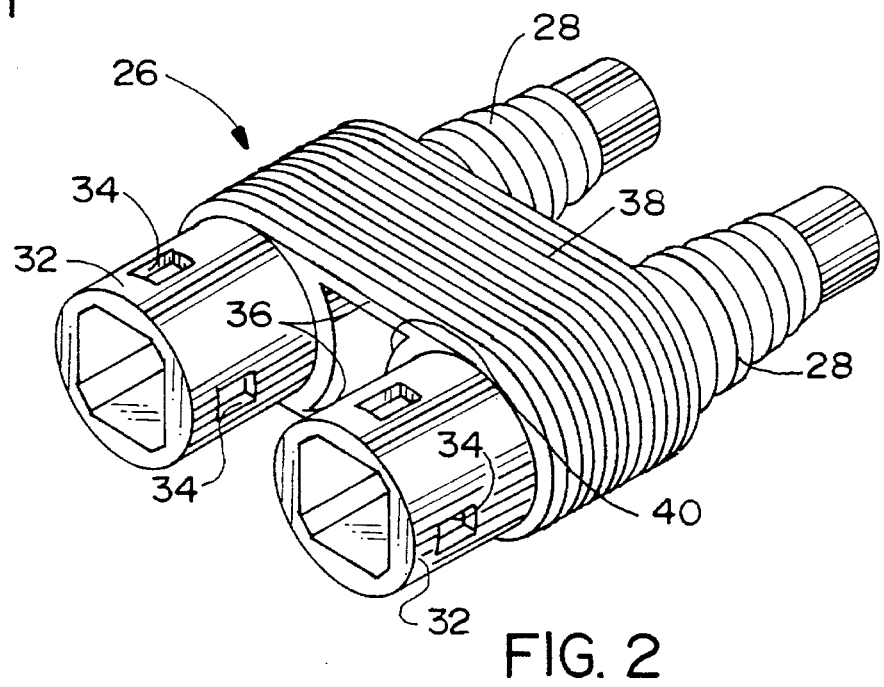
FIG. 2

DUPLEX CONNECTOR

FIELD OF THE INVENTION

This invention generally relates to the art of fiber optic connectors and, particularly, to a duplex connector system for coupling two individual simplex fiber optic connectors in a side-by-side alignment.

BACKGROUND OF THE INVENTION

Fiber optic devices use single or multiple strands of fibers each having an inner circular glass core coated with a circumferential cladding having a different index of refraction. Light is transmitted along the core and totally reflected from the interface between the core and cladding. Such devices can be used as transmission lines for transmitting information bearing light energy. A transmission line can be formed from a single fiber or it can include a plurality of fibers bundled together. Additionally, several transmission lines can be arranged in parallel for the simultaneous transmission of information along each of the separate lines.

Originally, fiber optic systems utilized simplex interconnection systems with single connector plugs terminating single fiber optic cables. In a simplex system, either transmission or reception of information can take place at one time. Consequently, simplex systems are limited in the amount of information that they can transmit and receive during a given period of time.

To increase the amount of information that can be communicated over fiber optic systems, multi-channel systems were developed. Such multi-channel systems include, for example, duplex connector plugs and cables which are capable of simultaneous transmission and reception. Thus, using a duplex system enables information to be transmitted at a much higher rate.

Despite the advantages, multi-channel fiber optic systems are relatively new, and many simplex systems and parts are already in use, for example, ST and SC type connectors. Consequently, simplex parts are readily available and less expensive because there is an existent inventory. Moreover, it would be difficult if not cost prohibitive to retrofit existing simplex systems with dedicated duplex or other multi-channel parts. Consequently, a need exists for an interconnection system which is compatible with both simplex and duplex parts and which permits the interconnection of simplex parts in a duplex configuration to provide duplex data transmission. Several designs have been proposed to address this problem. Typically, they involve an adapter structure which clamps on two individual connector housings to hold the two connectors in a side-by-side relationship forming a duplex connector and yet permits relative motion between the two individual simplex connectors.

A problem with the aforesaid adapter structures is that the adapters require the provision of an additional structure or component of the assembly (i.e. the adapter) beyond the ordinary components of the fiber optic connectors. One such adapter is disclosed in U.S. Pat. No. 4,953,929 to Basista et al. which patent is incorporated herein by reference. The additional adapter, therefore, adds expense and complexity to the duplex assembly. The present invention takes a completely different approach in making a duplex connector assembly from two simplex connectors without the addition of extraneous adapter structures.

SUMMARY OF THE INVENTION

An object, therefore, of the invention is to provide a new and improved duplex connector system for coupling two individual simplex fiber optic connectors in a side-by-side and parallel alignment.

As disclosed herein, each fiber optic connector includes a housing means in which an optical fiber cable is terminated through a rear end of the housing means. The invention contemplates the provision of first and second strain relief boots respectively interengageable with the housing means of the connectors at the rear ends thereof and encompassing the optical fiber cables. Resilient means interconnect the first and second strain relief boots, with the resilient means oriented between the boots for enabling the boots to hold the connectors in a side-by-side alignment.

In the preferred embodiment of the invention, the strain relief boots and the interconnecting resilient means comprise an integral structure fabricated of plastic material. The boots are generally cylindrical with a conical tail, and the resilient means is formed by a pair of integral, spaced-apart thin bands extending tangentially between diametrically opposite peripheral portions of the boots.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a perspective view of the duplex connector system of the invention coupling two individual simplex fiber optic connectors in a side-by-side relationship;

FIG. 1A is a perspective view of the metal housing insert of one of the connectors;

FIG. 2 is a perspective view, on an enlarged scale, of the integral boot structure;

DETAILED DESCRIPTION OF THE PREFERRED EMBODIMENT

Figure 3:
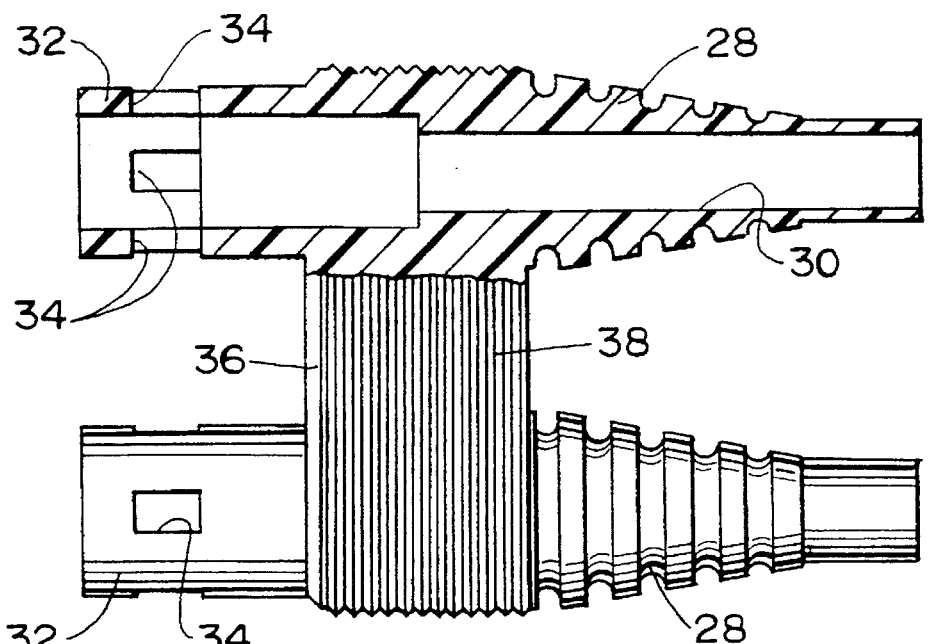
FIG. 3 is a top plan view of the integral boot structure, with one of the boots in section.
Figure 4:
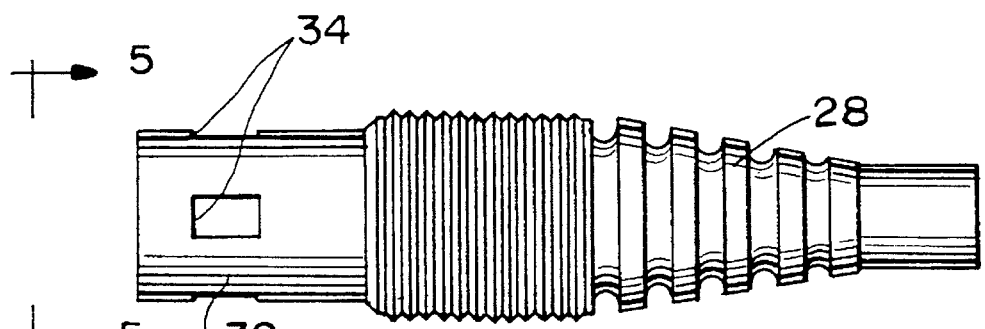
FIG. 4 is a side elevational view of the integral boot structure.

Referring to the drawings in greater detail, and first to FIG. 1, the invention is embodied in a duplex connector system, generally designated 10, for coupling two individual simplex fiber optic connectors, generally designated 12, in a side-by-side alignment, as shown. Each fiber optic connector includes a housing means, generally designated 14, within which an optical fiber cable 16 is terminated from a rear end 18 of the housing. As is known in the art, each optical fiber cable 16 has an outer jacket encompassing a central glass fiber 20. The fibers of cables 16 are shown terminated in ferrules 22 which project slightly from front ends 24 of connector housing means 14. As is known in the art, the ferrules may be fabricated of ceramic material.

Referring to FIG. 1A in conjunction with FIG. 1, each housing means 14 of each connector 12 is a two-part housing including an inner metal housing insert 14a (FIG. 1A) and an outer plastic housing shell 14b (FIG. 1). The optical fiber cables 16 are terminated in the ferrules 22 located in the metal housing inserts 14a, and the ferrules 22 project forwardly from the metal housing inserts.

The above description of simplex fiber optic connectors 12 and optical fiber cables 16 is fairly conventional. In addition, most fiber optic connectors include strain relief boots coupled to the metal connector housing inserts 14a and projecting from the rear ends of the outer housing shells 14b. The strain relief boots encompass the optical fiber cables, to provide strain relief for the cables. The present invention utilizes these boot structures to provide the duplex connector system 10 of the invention.

More particularly, referring to FIGS. 2–5 in conjunction with FIGS. 1 and 1A, the invention contemplates an integral boot structure, generally designated 26, which includes first and second strain relief boots 28 encompassing optical fiber cables 16. FIG. 3 shows that each boot 28 includes a passage 30 into which a respective one of the optical fiber cables extend. The boots have forward ends 32 which are insertable into outer housing 14b and are mounted on the metal housing insert 14a. As illustrated, mounting includes four apertures 34 located in each of the forward ends 32 of the boots which interengage with corresponding projections 35 on the outside of the inner housing inserts 14a as seen in FIG. 1A. Preferably, integral boot structure 26 is unitarily molded of plastic material and, thereby, apertures 34 can snappingly interengage with projections 35 on the outside of each inner metal housing insert 14a.

Figure 5:
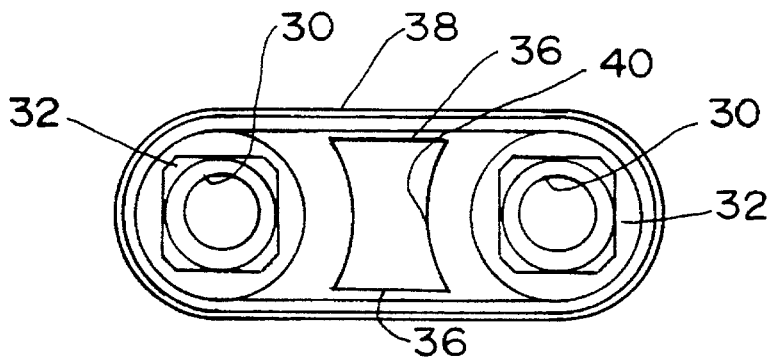
FIG. 5 is an end elevational view looking generally in the direction of line 5—5 of FIG. 4.

Generally, the invention contemplates the provision of resilient means interconnecting first and second strain relief boots 28 and oriented therebetween for enabling the boots to hold connectors 12 in a side-by-side alignment as shown in FIG. 1. In particular, the resilient means is provided by a pair of spaced-apart thin bands 36 which extend between diametrically opposite peripheral portions of boots 28. In other words, the boots are generally cylindrical, and bands 36 extend generally tangentially between the top and bottom peripheral portions of the boots (i.e. on opposite diametric sides thereof). The bands and the peripheral portions of the boots are provided with serrations or ridges, as at 38, to facilitate gripping integral boot structure 26 and assembling of the boot structure to connector housings 14, as well as for mating and unmating of the assembled duplex connector 10. FIGS. 2 and 5 show how bands 36 are spaced apart by an opening 40. Therefore, the thin bands, being fabricated of plastic material provide a resilient means between boots 28 which allows the boots to move in both "X" and "Y" directions when subjected to outside forces. Of course, in the static condition of integral boot structure 26, simplex fiber optic connectors 12 are maintained in the side-by-side relationship shown in FIG. 1.

Figure 6:
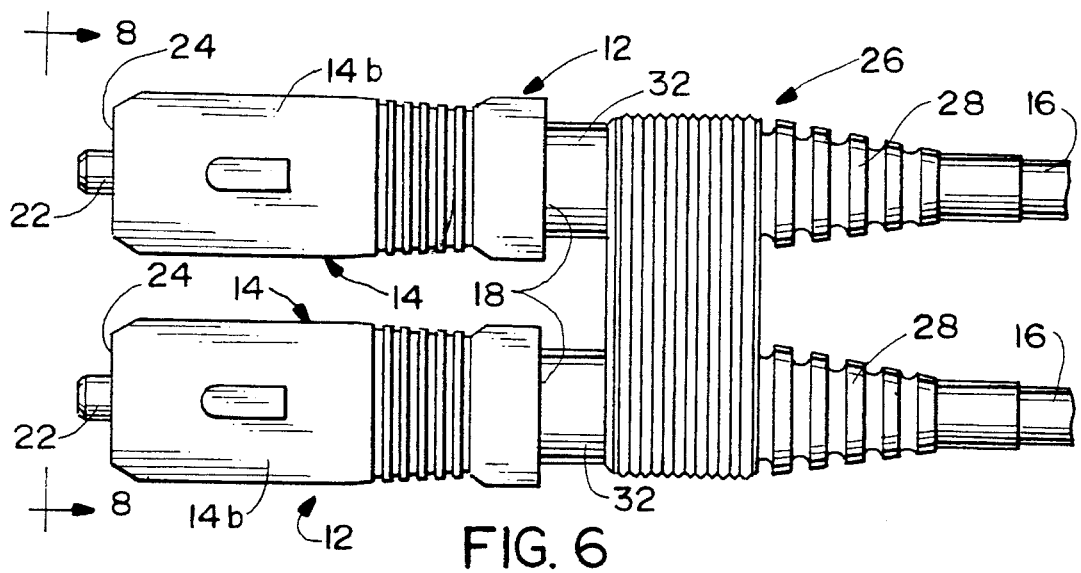
FIG. 6 is a top plan view of the assembly shown in FIG. 1.
Figure 7:
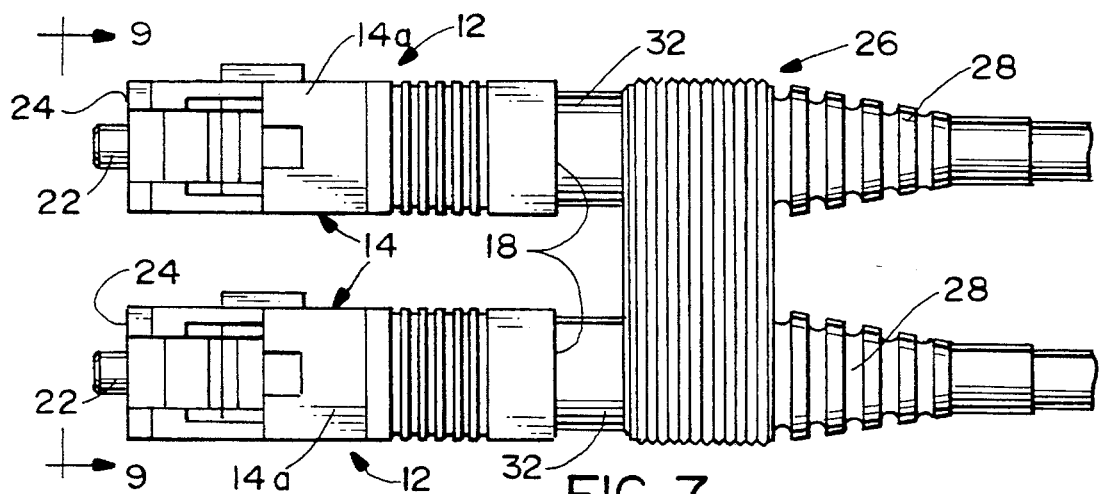
FIG. 7 is a view similar to that of FIG. 6, but with the fiber optic connectors rotated 90° from their positions shown in FIG. 6.
Figure 8:
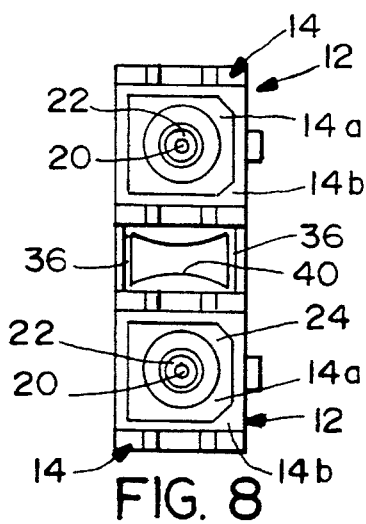
FIG. 8 is an end elevational view looking generally in the direction of line 8—8 in FIG. 6.
Figure 9:
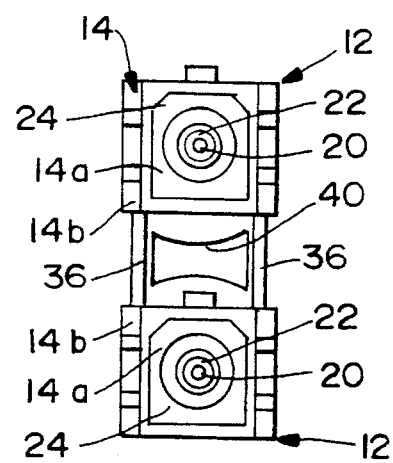
FIG. 9 is an end elevational view looking generally in the direction of line 9—9 in FIG. 7.

FIGS. 6–9 show an advantage of the duplex connector system of the invention over prior art systems. In particular, FIGS. 6 and 8 show simplex fiber optic connectors 12 in orientations as depicted in FIG. 1, and coupled to integral boot structure 26. On the other hand, FIGS. 7 and 9 show the connectors rotated 90° relative to their orientations in FIGS. 6 and 8, but with the connectors still coupled to integral boot structure 26 in their side-by-side alignment. This ability to vary the angular orientations of the fiber optic connectors is not possible in most systems of the prior art which include separate adapters for clamping onto the exterior of the connector housings, because the sides of the outer housing shells 14b are different, whereas the coupling means between the boots and inner metal housing inserts 14a can be omni-directional. The system of the present invention takes advantage of this feature while providing a duplex system, which cannot be done with the prior art.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A duplex connector system for coupling two individual simplex fiber optic connectors in a side-by-side alignment, each fiber optic connector including a housing means in which an optical fiber cable is terminated through a rear end of the housing means, comprising:

first and second strain relief boots respectively interengageable with the housing means of the connectors at said rear ends thereof and encompassing said optical fiber cables; and means interconnecting said first and second strain relief boots and oriented therebetween for enabling the boots to hold said connectors in said side-by-side alignment.

2. The duplex connector system of claim 1 wherein said interconnecting means is resilient means allowing relative motion between said individual connectors.

3. The duplex connector system of claim 2 wherein said strain relief boots and said interconnecting resilient means comprise an integral structure.

4. The duplex connector system of claim 3 wherein said integral structure is comprised of plastic material.

5. The duplex connector system of claim 2 wherein said resilient means comprises a band extending between the boots.

6. The duplex connector system of claim 2 wherein said boots are generally cylindrical, and said resilient means comprise a pair of spaced-apart bands extending tangentially between diametrically opposite peripheral portions of the boots.

7. The duplex connector system of claim 2 wherein said housing means of each connector comprises a two-part housing including an inner metal housing insert and an outer plastic housing shell, and said first and second strain relief boots are adapted for interengagement with the inner metal housing inserts.

8. In a duplex connector system for coupling two individual simplex fiber optic connectors in a side-by-side alignment, with each fiber optic connector including a housing means in which an optical fiber cable is terminated through a rear end of the housing means, wherein the improvement comprises an integral boot structure including first and second strain relief boot portions respectively interengageable with the housing means of the connectors at said rear ends thereof and encompassing said optical fiber cables, and resilient means integrally interconnecting said first and second strain relief boots and oriented therebetween for enabling the boots to hold said connectors in said side-by-side alignment and allow relative motion between the two individual connectors.

9. In a duplex connector system as set forth in claim 8, wherein said resilient means comprises a band extending between said boot portions.

10. In a duplex connector system as set forth in claim 8 wherein said boot portions are generally cylindrical, and said resilient means comprise a pair of spaced-apart bands extending tangentially between diametrically opposite peripheral portions of the boot portions.

* * * * *